(12) United States Patent
Aoki et al.

(10) Patent No.: US 7,822,607 B2
(45) Date of Patent: Oct. 26, 2010

(54) COMPUTER APPLICATION ENVIRONMENT AND COMMUNICATION SYSTEM EMPLOYING AUTOMATIC IDENTIFICATION OF HUMAN CONVERSATIONAL BEHAVIOR

(75) Inventors: Paul M Aoki, Berkeley, CA (US);
Margaret H Szymanski, Santa Clara, CA (US); James D Thornton, Redwood City, CA (US); Allison G Woodruff, Berkeley, CA (US); Nicolas B Ducheneaut, Mountain View, CA (US); Robert J Moore, San Jose, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 671 days.

(21) Appl. No.: 11/401,049

(22) Filed: Apr. 10, 2006

(65) Prior Publication Data

US 2007/0055490 A1 Mar. 8, 2007

Related U.S. Application Data

(60) Provisional application No. 60/711,740, filed on Aug. 26, 2005.

(51) Int. Cl.
*G10L 11/00* (2006.01)
*G10L 21/00* (2006.01)

(52) U.S. Cl. ........................ 704/270; 704/275

(58) Field of Classification Search ................. 704/275, 704/270; 370/260; 379/88.13; 463/42, 35
See application file for complete search history.

(56) References Cited

U.S. PATENT DOCUMENTS 3,944,736 A 3/1976 Shepard
4,317,961 A 3/1982 Johnson
4,531,024 A 7/1985 Colton et al.
4,734,934 A 3/1988 Boggs et al.
5,473,605 A 12/1995 Grube et al.
5,483,588 A 1/1996 Eaton et al.
5,491,743 A * 2/1996 Shiio et al. ................. 709/204
5,495,522 A 2/1996 Allen et al.
5,548,638 A 8/1996 Yamaguchi et al.

(Continued)

OTHER PUBLICATIONS

M. Ackerman et al., "Hanging on the Wire: A Filed Study of an Audio-Only Media Space," ACM Transactions on Computer-Human Interaction, vol. 4, No. 1, pp. 39-66 (Mar. 1998).

(Continued)

*Primary Examiner*—Talivaldis Ivars Smits
*Assistant Examiner*—Shaun Roberts
(74) *Attorney, Agent, or Firm*—Patrick J. S. Inouye; Krista A. Wittman (57) ABSTRACT

The disclosed technology is a computer application that establishes communication between a conversation-finder module and a computer application environment. The conversation-finder module determines a conversational floor based on three or more floor determination inputs. The conversational floor associates at least two of the three or more floor determination inputs as being on the conversational floor. The conversation-finder module and the computer application environment can be responsive to each other and can adapt to each other. That is (either or both), the computer application environment can adapt to the conversational floor(s) determined by the conversation-finder module; and the conversation-finder module can determine the conversational floors responsive to a floor determination input and/or control input from the computer application environment.

24 Claims, 3 Drawing Sheets

U.S. PATENT DOCUMENTS

| | | | |
|---|---|---|---|
| 5,557,725 | A | 9/1996 | Ansberry et al. |
| 5,561,737 | A | 10/1996 | Bowen |
| 5,566,238 | A | 10/1996 | Wagner et al. |
| 5,668,863 | A | 9/1997 | Bieselin et al. |
| 5,761,637 | A * | 6/1998 | Chino .................... 704/231 |
| 5,768,263 | A | 6/1998 | Tischler et al. |
| 5,771,273 | A | 6/1998 | McAllister et al. |
| 5,818,514 | A | 10/1998 | Duttweiler et al. |
| 5,889,764 | A | 3/1999 | Needham et al. |
| 5,889,843 | A | 3/1999 | Singer et al. |
| 5,953,400 | A | 9/1999 | Rosenthal et al. |
| 5,991,277 | A | 11/1999 | Maeng et al. |
| 5,991,385 | A | 11/1999 | Dunn et al. |
| 6,157,711 | A | 12/2000 | Katz |
| 6,178,237 | B1 | 1/2001 | Horn |
| 6,236,854 | B1 | 5/2001 | Bradshaw, Jr. |
| 6,304,648 | B1 | 10/2001 | Chang |
| 6,327,567 | B1 | 12/2001 | Willehadson et al. |
| 6,463,038 | B1 | 10/2002 | Wilson |
| 6,501,739 | B1 * | 12/2002 | Cohen .................... 370/260 |
| 6,608,644 | B1 * | 8/2003 | Kondo et al. ............ 348/14.09 |
| 2001/0053212 | A1 | 12/2001 | Mark et al. |
| 2002/0065928 | A1 | 5/2002 | Senga et al. |
| 2002/0103863 | A1 | 8/2002 | Pearson |
| 2002/0143877 | A1 | 10/2002 | Hackbarth et al. |
| 2002/0172339 | A1 | 11/2002 | Creswell et al. |

OTHER PUBLICATIONS

E. Addeo et al., "An experimental Multi-Media Bridging System," Bell Communications Research, pp. 236-242 (1988).

B. Arons, "A Review of the Cocktail Party Effect," Journal of the American Voice I/O Society, vol. 12, pp. 35-50 (1992).

L. Berc et al., "Pssst: Side Conversations in the Argo Telecollaboratiob System," Proceedings of UIST '95, Pittsburgh, PA, pp. 155-156 (Nov. 14-17, 1995).

S. Bly et al., "Media Spaces: Bringing People Together in a Video, Audio, and Computing Environment," Communications of the ACM, vol. 36, No. 1, pp. 27-47 (Jan. 1998).

P. Brady, "Effects of Transmission Delay on Conversational Behavior on Echo-Free Telephone Circuits," Bell Systems Technical Journal, vol. 50, pp. 115-134 (Jan. 1971).

M. Cohen et al., "Multidimensional Audio Window Management," International Journal of Man-Machine Studies, vol. 34, No. 3, pp. 319-336 (Mar. 1999).

M. Corner et al., "Zero- Interaction Authentication," Conference on Mobile Computing and Networking (MobiCom '02) (Sep. 23-28, 2002).

P. Dourish, "Awareness and Coordination in Shared Workspaces," In Proceedings of ACM CSCM '92 Conference on Computer Supported Cooperative Work, Toronto, Canada, pp. 107-114 (Nov. 1992).

C. Edelsky, "Who's Got the Floor?" Language in Society, vol. 10, pp. 383-421 (1981).

M. Egbert, "Schisming: The Collaborative Transformation Form a Single Conversation to Multiple Conversations," Research on Language & Social Interaction, vol. 30, No. 1, pp. 1-51 (1997).

G. Kleiter, "The Posterior Probability of Bayes Nets with Strong Dependences," Soft Computing, vol. 3, pp. 162-173 (1999).

Kwang Hong Lee, "Improptu: Audio Applciations for Mobile IP," Thesis submitted to Massachusetts Institute of Technology (Sep. 2001).

M. Meteer et al., "Application Development: Just the Facts," Speech Technology Magazine, printed from http://www.speechtechmag.com/pub/3_3/cover/445-1.html (Jun./Jul. 1998).

N. Morgan et al., "The Meeting Project at ICSI," Proceedings of HLT 2001, First International Conference on Human Language technology Research, J, Allan, ed.,Morgan Kaufmann, San Francisco, pp. 246-252 (2001).

E. Patterson et al., "Voice Loops as coordination Aids in Space Shuttle Mission Control," Computer Cupported Cooperative Work, vol. 8, pp. 353-371 (1999).

J. Rohlicek et al., "Gisting Conversational Speech," Proceedings of the 1992 IEEE International Conference of Acoustics, Speech and Signal Processing, vol. 2, pp. 113-116 (1992).

H. Sacks "Notes on Methodollgy," Atkinson, J. and Heritage, John (eds.): Structure of Social Action: Studies in Conversation Analysis. Cambridge University Press, pp. 21-27 (1984).

H. Sacks et al., "A Simplest Systematics for the Organization of Turn-Taking for Conversation," Language, vol. 50, pp. 696-735 (1974).

N. Sawhney et al., "Nomadic Radio: Speech and Audio Interaction for Contextual Messaging in Nomadic Environments," ACM Transactions on Computer-Human Interaction, vol. 7, No. 3, pp. 353-383 (2000).

E. Schegloff et al., "The Preference for Self-Correction in the Organization of Repair in Conversation," Language, vol. 53, pp. 361-382 (1977).

A. Sellen, "Remote Conversations: The Effects of Mediating Talk with Technology," Human-Computer Interraction, vol. 10, pp. 401-444 (1995).

J. Shell et al. "Interacting with Groups of Computers," Communication of the ACM, vol. 46, No. 3, pp. 40-46 (Mar. 2003).

A. Skaburskis et al., "AuraMirror: Artistically Visualizing Attention," CHI 2003, Ft. Luderdale, Florida (Apr. 5-10, 2003).

I. Smith et al., "Low Distrubance Audio for Awareness and Privacy in Media Space Applications," Proceedings of ACM Conference on Multimedia, San Francisco, CA: ACM (Nov. 1995).

R. Stiefelhagen et al., "Estimating Focus of Attention Based on Gaze and Sound," In IEEE PUI, Orlando, FL (2001).

R. Stiefelhafen et al., "Modeling Focus of Attention for Meeting Indexing Based on Multiple Cues," IEEE transactions on Neural Networks, vol. 13, No. 4, pp. 928-938 (Jul. 2002).

R. Stiefelhafen, "Tracking and Modeling Focus of Attention in Meetings," Dissertation, University of Karlsruhe (Jul. 5, 2002).

R. Stiefelhafen, "Tracking Focus of Attention in MEETINGS," Proceedings of the Fourth IEEE Internation conference on multimodal Interfaces (ICMI '02)., Pittsburgh, PA (2002).

H. Strub "Concert Ralk: A Weekend with a Portable Audio Space," In Proceedings of the $6^{th}$ IFIP Conference on Human-Computer Interaction (INTERACT '97). Chapman and Hall, London, U.K.

W. Thomason et al., "Pauses, Transition Relevance, and Speakse change," Human Communication Research, vol. 18, No. 3, pp. 429-444 (Mar. 1992).

D. Traum et al., "Embodied agents for Multi-Party Dialogue in Immersive Virtual Worlds," AAMAS '02, First Joint Conference Autonomous Agents & Multi-Agent Systems, vol. 2, pp. 766-773 (2002).

R. Vertegaal et al., "Gaze-2: Conveying Eye Contact in Group Video Conferencing Using Eye-Controlled Camera Direction," CHI 2003, Ft. Aluderdale, Florida (2003).

S. Whittaker et al., "Informal Workplace Communication: What Is it Like and How might We Support It?" Human Factors In Computing Systems, Boston, Massachusetts, Apr. 24-28, pp. 131-137 (Apr. 24-28, 1994).

L. Wilcox et al., "Training and Search Algorithms for and Interactive Wordspotting System," Proceedings of the International Conference on Acoustics, Speech and Signal Processing, pp. 97-100 (Mar. 1992).

J. Wilpon et al., "Automatic Recognition of Keywords in Unconstrained Speech Using Hidden Markov Models," IEEE Transactions on Accoustics, Speech and Signal Processing, vol. 38, No. 11, pp. 1870-1878 (Nov. 1990).

T. Wilson et al., "The Structure of Silence Between Turns in Two-Party Conversation," Discourse Processes, vol. 9, pp. 375-390 (1986).

J. Ye et al., "Phoneme Classification Using Naïve Bayes classifier in Reconstructed Phase Space," IEEE Digital Signal Processing Workshop (2002).

S. Basu, "Conversational Scene Analysis" Thesis of the Degree of Doctor of Philosophy in Electrical Engineering and Computer Science at the Massachussets Institute of Technology (Sep. 2002).

M. Bull et al., "An Analysis of the Timing of Turn-Taking in a Corpus of Goal-Oriented Dialogue," Proceedings of ICSLP '98: International conference on Spoken Language Processing (ICSLP), vol. 4, pp. 1179-1182 (Nov. 30-Dec. 4, 1998).

* cited by examiner

COMPUTER APPLICATION ENVIRONMENT AND COMMUNICATION SYSTEM EMPLOYING AUTOMATIC IDENTIFICATION OF HUMAN CONVERSATIONAL BEHAVIOR

CROSS-REFERENCE TO RELATED APPLICATIONS

This application claims the benefit under 35 USC 119(e) to U.S. Provisional Patent Application Ser. No. 60/711,740, filed Aug. 26, 2005 and having the title "Computer Application Environment And Communication System Employing Automatic Identification Of Human Conversational Behavior."

Published U.S. Patent Application No: US 2004/0172255 A1, published Sep. 2, 2004, filed Apr. 16, 2003, entitled Methods, Apparatus, and Products for Automatically Managing Conversational Floors in Computer-Mediated Communications, by Aoki et al. is hereby incorporated by reference in its entirety and contains essential material. The inventors of the instant application have assigned, or are subject to an obligation of assignment of the instant application to the assignee of U.S. patent application Ser. No. 10/414,923.

Published U.S. Patent Application No: US 2004/0172252 A1, published Sep. 2, 2004, filed Apr. 16, 2003, entitled Methods, Apparatus, and Products for Identifying a Conversation, by Aoki et al. is hereby incorporated by reference in its entirety and contains essential material. The inventors of the instant application have assigned, or are subject to an obligation of assignment of the instant application to the assignee of U.S. patent application Ser. No. 10/414,912.

FIELD

The technology disclosed herein relates to the field of computer-mediated group communication systems.

BACKGROUND

There exists a need for computer applications or computerized devices to be able to identify conversations between a group of sources, adapt to these conversations and/or influence the identification of conversations.

DETAILED DESCRIPTION

One aspect of the disclosed technology is a computer application that establishes communication between a conversation-finder module and a computer application environment. The conversation-finder module determines a conversational floor based on three or more floor determination inputs. The conversational floor associates at least two of the three or more floor determination inputs as being on the conversational floor. The conversation-finder module and the computer application environment can be responsive to each other and can adapt to each other. That is (either or both), the computer application environment can adapt to the conversational floor(s) determined by the conversation-finder module; and the conversation-finder module can determine the conversational floors responsive to a floor determination input and/or control input from the computer application environment.

The essential material that has been incorporated by reference teaches a conversation-finder module that can be a service or application executing in a computer or able to be invoked over a network. The conversation-finder module can also be incorporated with a special purpose hardware module that interfaces to a computer bus (for example, a conversation-finder device). The conversation-finder module can accept input from multiple sources (such as audio streams) as well as information provided by the computer application environment and use conversational characteristics determined from this information to assign the source to a conversational floor. The computer application environment can also act as a source to the conversation-finder module as well as act on the results of the conversation-finder module. Furthermore, the computer application environment and the conversation-finder module can exchange state and control information.

The conversational characteristics can include both audio characteristics and physiological characteristics (such as can be determined by a biometric device, for example an eye-tracker device). Although much of the following explicitly describes the analysis of audio characteristics, one skilled in the art can, after reading the disclosure herein and the essential material that has been incorporated by reference, apply equivalent techniques to any available physiological characteristics that can be received.

The essential material that has been incorporated by reference teaches temporal features that can be classified using known pattern recognition techniques. Once these features are determined, they can be used to compute likelihoods, posterior probabilities, and conversational floor configurations as is described by the essential material that has been incorporated by reference. One skilled in the art will understand that having the ability to identify a conversational floor allows embodiments using the disclosed technology to identify conversations and the sources that are participating in the conversation.

Generally, there is an audio source and an output dedicated to each user. In addition, additional inputs can be included that need not have a corresponding output (for example, computer generated system status messages, computer generated utterances, or override communications).

Figure 3:
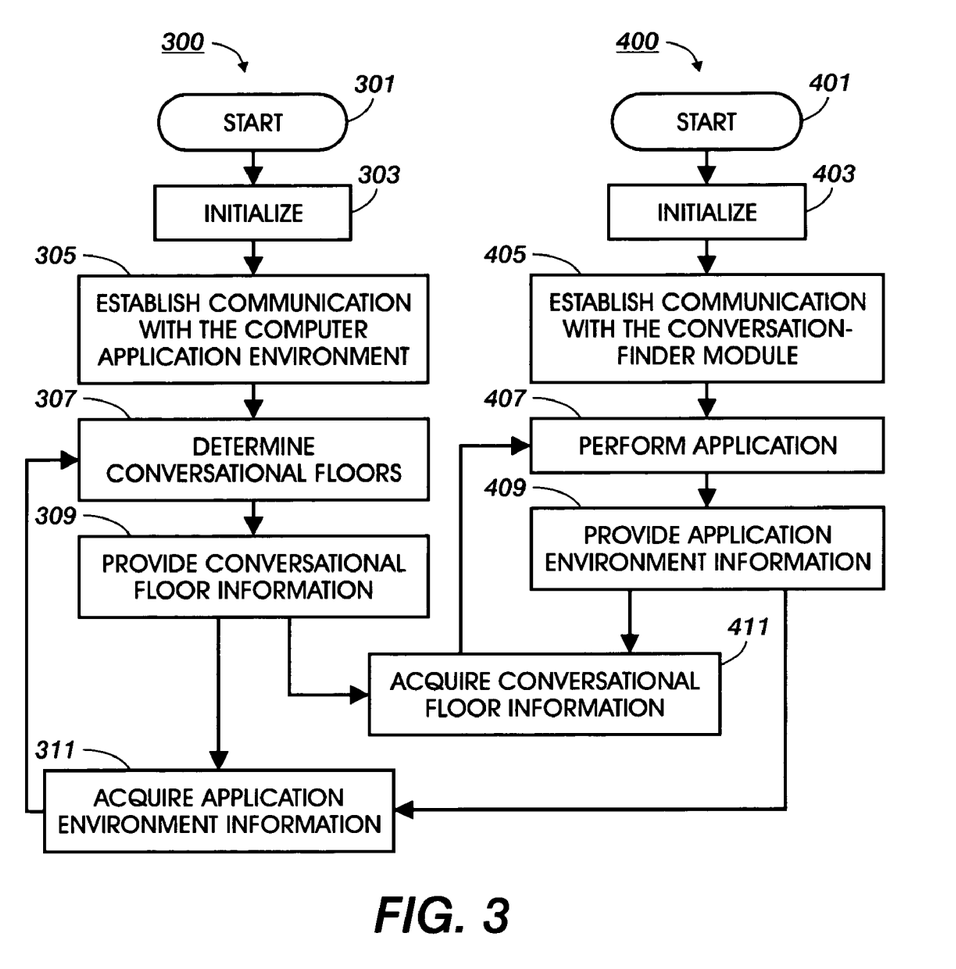
FIG. 3 illustrates the cooperation between the computer application environment and the conversation-finder module in accordance with one embodiment.

FIG. 3 of the essential material that has been incorporated by reference illustrates a group communication system architecture 300 that includes a floor analysis module 303 that analyzes data from the sources for conversational characteristics to determine conversational features. The results of the floor analysis module 303 can be used to automatically determine which sources are members in a conversation. Each detected conversation establishes a conversational floor that associates the members in the conversation.

The conversation-finder module can be implemented using a subset of the group communication system architecture 300 taught by FIG. 3 of the essential material that has been incorporated by reference. The conversation-finder module uses input streams (that can be audio data and/or situation information provided by a computer). However, the output of the floor analysis module 303 provides a floor representation related to the conversations detected by the floor analysis module 303. The input streams can be associated with audio sources (human, computer generated, recorded, and the like), and/or with situation information. The floor analysis module 303 can automatically identify one or more conversational floors that correspond to any two or more of three or more audio sources that are in a conversation. Once the conversational floor is determined, a floor representation that identifies at least one conversational floor and/or the audio sources in conversation can be presented.

The input streams to the conversation-finder module can be audio inputs provided by the computer application environment, non-audio information provided by the computer application environment, audio input provided external to the computer application environment, and non-audio input provided external to the computer application environment. For example in a command and control collaborative environment, conversational floors can be automatically established between members by detecting conversations between those members. This determination can be modified or adjusted by non-audio information (such as a representation of the organizational structure that includes the personnel operating the collaborative environment) provided by the command and control computer application and/or component. In addition, external audio input (for example, from an audio source that is not input to the conversation-finder module, or by an audio source that has a broadcast capability, etc.) can be distributed to each output (for example, an emergency announcement). Furthermore, non-audio input can be provided to computer application environment from devices to show proximity of the potential members (for example, global positioning system data), status of the potential members (for example, biometric data of the members), etc.

An 'additional response analysis' module 328 can be included with the floor analysis module 303 that receives non-audio data such as video information, biometric information, eye-tracking information etc. The 'additional response analysis' module 328 can analyze this data to determine conversational characteristics that can be correlated with the audio information provided by the one or more analysis audio data paths 317 as well as information developed by other modules in the floor analysis module 303. The analysis results of the 'additional response analysis' module 328 can be incorporated with the other analysis performed by the floor analysis module 303 to determine conversational floors.

FIG. 5 of the essential material that has been incorporated by reference illustrates a floor control data structure 500 that includes a source data structure 501 that has a number-of-sources field 503 and a source/output-structure-pointer array 505. The number-of-sources field 503 specifies the number of active sources (in some implementations this field can specify the total number of possible sources). The source/output-structure-pointer array 505 associates each source with a pointer to an output data structure 507. The output data structure 507 includes a number of outputs field 509 that specifies the number of outputs to which audio from the source is to be distributed. The contents of the number-of-sources field 503 and the output data structure 507 is generally expected to be the same (but can be different for transitional states or for special purpose applications). The output data structure 507 also includes an output control array 511 that can include an output identification field, a volume field and an audio modification field.

The source data structure 501 in the essential material that has been incorporated by reference can be used to distribute audio information from the associated source to each output as modified by the volume and audio modification fields for that output. The volume and audio modification fields can be automatically adjusted by the floor analysis module 303 through the floor control path 305. Thus for each output, the audio mixer 301 can mix contributions from each source as specified by the floor control data structure 500.

One skilled in the art, after reading the disclosure of the essential material that has been incorporated by reference, can expand the floor control data structure 500 to support video focusing in a video conference situation. That is, as a conversational floor is established between participants of a video conferencing session, the members of the conversational floor can have a different video representation than do the members of another conversational floor. These modifications can result in highlighting the views containing the 'other users' on 'this user's' conversational floor. The highlighting can be done by size, color, placement, etc. of the view. Furthermore, such a one will understand that in the textual communication environment, that the output control array 511 can contain fields that control the appearance of the text of the communication (for example, size, color, shading etc.) to indicate floor membership. Both the textual and video representations are examples of visual indications of floor membership. In addition, other visual representations of the floor configuration can be presented to the user(s) by graphical, textual, or other indicator mechanisms.

One skilled in the art will understand that the inventive techniques disclosed at least in FIG. 15 and FIG. 17 of the essential material that has been incorporated by reference can be used with other communication besides audio communications. Thus, referential and responsive analysis can also be applied to textual communication (such as chat, instant messaging, or UNIX talk as well as to other types of communication).

The floor analysis module 303 not only establishes conversation group membership, but it can also track conversations between the audio sources. Thus, a conversation-finder module that includes the capability of the floor analysis module 303 can be used to enhance a virtual reality environment, an augmented reality environment, a mixed reality environment, a computer game environment and a video game environment as well as other presentation environments. The conversation-finder module can also be used to enhance communication in an entertainment application, a collaborative application, or a multiplayer game environment as well in real-life command and control environments such as military, fire, disaster response, medical environments, and the like. In addition, any computer application that includes functionality such as, or equivalent to that in the floor analysis module 303, contains a conversation-finder module.

Presentation of the floor representation can be accomplished by any method whatsoever including storing the floor representation in a conversation log, explicitly or implicitly displaying a visual representation of the floor representation on a display device (where the floor representation may or may not have first been retrieved from the conversation log), sending the floor representation to a client computer (using any communication mechanism whatsoever), and/or making the floor representation available to a computer application or procedure.

An example of explicitly displaying the floor representation would include presenting a graphic, table, text, or image of which sources were on which conversational floor. An example of implicitly displaying the floor representation would include altering an icon, avatar, or graphic associated with a member on the conversational floor to indicate that the member was on that conversational floor or was in communication with the other members on that conversational floor.

Some embodiments identify which of the audio sources are participating in a conversation defined by the conversational floor. This identification can be stored in the conversation log as well as being displayed or otherwise presented. This indication can be accomplished by displaying a representation of the audio sources on the conversational floor as part of the visual representation of the floor representation. The representation of an audio source can be an icon, an avatar, a graphic, a textual identification etc.

In some embodiments, the computer application environment is a collaborative environment designed for interaction among human users, computers controlled by human users or computers programmed to emulate human users. Conversations can develop between these users and these conversations can result in the determination of a conversational floor by a conversation-finder module. A floor representation can then be used to enhance the computer application environment. In addition, the computer application environment can influence the conversation-finder module. This enhancement and influence can occur separately or at the same time.

One example of a collaborative environment is if the computer application environment includes a collaborative component that has multiple inputs such that the conversation-finder module can assign members to conversational floors.

Another example is if the computer application environment includes a group display component such as an entertainment component where the entertainment experience is shared between the members of the group. One example of such a component is a media playback component described in U.S. patent application Publication No. 2006/0174312, published on Aug. 3, 2006, entitled "Methods, Apparatus, and Program Products to Support a Shared Viewing Experience From Remote Locations" by Ducheneut et al., that is hereby incorporated by reference and discloses a Social TV system. Another example is an interactive media component (such as shared web browsing).

Another example of a group display component is if the computer application environment includes a virtual reality component, or a multiplayer game component such as a "massive multiplayer online role playing game" (MMORPG) or "first person shooter" (FPS) game. Here the interactions of the avatars in the MMORPG (the computer application environment) can provide input (such as proximity between avatars, the direction the avatars are facing, etc.) to the conversation-finder module as to which of the avatars are in which conversation. Furthermore, the conversation-finder module can also provide input to the computer application environment responsive to detected conversations. This allows the computer application environment to respond to the position, orientation, and actions of the avatars in the conversation.

Another example of a group display component is if the computer application environment includes an augmented reality component that can augment a real-world environment with computer generated information (for example, via a "heads-up-display"). Uses of the augmented reality component can include informational overlay presentation on a HUD of which people in an environment are engaged in which conversation. The conversational topic can also be presented.

Another example of a group display component is if the computer application environment includes a mixed reality component, which is similar to the augmented reality component but includes images that are not in the real-world environment. For example, if one member of a conversation was equipped with a video camera and HUD, and a second member was equipped with a separate HUD, the second member could experience the same view as the first member.

Another example of a group display component is if the computer application environment includes a group conference component, such as a networked meeting capability that shares graphical information and/or a group conference capability.

Another example of a collaborative environment is if the computer application environment includes a command and control component for use in military, fire, disaster response, medical, and other like environments.

In addition, a conversational indicator can be applied to the visual representation of an audio source to indicate which audio sources are in a conversation (on a conversational floor). The conversational indicator can alter the display of the visual representation of an audio source by adding an aura (for example, a transparent graphical highlight surrounding the representation of the audio source), a tint (for example, adding a color or luminosity shift to the representation of the audio source), a connection graphic (for example, adding connection lines, bars or other visual association that connects the audio sources that are on the conversational floor), an overlay (for example, labels, controls, or other information/operation data), and an invisibility mask (that can be used to mask off representations of audio sources that are not on the conversational floor). Of course, one skilled in the art will understand that the presentation of the representations of the audio sources can be conditioned on the viewer's selection of a particular conversational floor.

Once a conversational floor is established a floor representation can be presented to the members of the conversational floor, to floor monitors, to administrators of the computer application environment, or saved to replay interactions. Presentation of the floor representation can be accomplished by any single or any combination of: storing the floor representation on a tangible media or file system, displaying a visual representation of the floor representation, displaying an avatar representing one of the three or more floor determination inputs, displaying an indicator that indicates which of the three or more floor determination inputs is associated with the conversational floor, indicating (by animation, by audio, or similar indication) that the avatar is associated with the conversational floor, altering the visual representation of at least one of the three or more floor determination inputs responsive to a change in the floor representation, displaying an alteration in the avatar responsive to a change in the conversational floor, influencing the avatar responsive to the conversational floor, and altering the visual representation by applying a conversational indicator to the visual representation wherein the conversational indicator is selected from one or more of the group consisting of an aura, a tint, a connection graphic, an overlay, and an invisibility mask.

Both the conversation-finder module and the computer application environment can detect the persistence of the conversational floor. A conversational floor is persistent if the floor exists for a sufficiently long period with a sufficiently stable set of members. One characteristic of persistence is a floor duration parameter that indicates how long the floor has existed. The floor duration parameter can be generated by the duration of a single conversation, or a number of conversations by substantially the same members over time. Another characteristic of persistence is a floor stability parameter that indicates the stability of the membership of the conversation. Thus, if all members of the floor remain throughout the conversation, the floor is particularly stable. However, if a single member has many one-on-one conversations with many transient members, the floor would have a low stability. Thus, said computer application environment can provide input to the conversation-finder module that can alter the conversational floors; the conversation-finder module can provide input to the computer application environment that alters the computer application environment processes and displays (such as by indicating floor membership on a display or otherwise); and each can affect the other simultaneously.

Both the conversation-finder module and the computer application environment can store a floor association that indicates which members were together in a conversation. This can be used for logging purposes and as a factor in determining whether a floor should be created (members who have once been in conversation with other members are more likely to establish a subsequent conversation with some or all of these members). In addition, the floor association can be used to generate any combination of a group of services such as generating electronic mail addresses, a distribution list, an access control group, a shared workspace, etc. Thus, the members in the conversation can be associated with these services.

Where the representation of an audio source is represented by an avatar, the avatar can be influenced by the conversational floor or by other avatars on the same conversational floor. The avatar can be conditioned to, for example, move and group together with other avatars, turn toward other avatars, animate conversation, etc. Further, the display of avatars in one conversation can different from the display of avatars that are not in conversation and/or are in other conversations.

Figure 1:
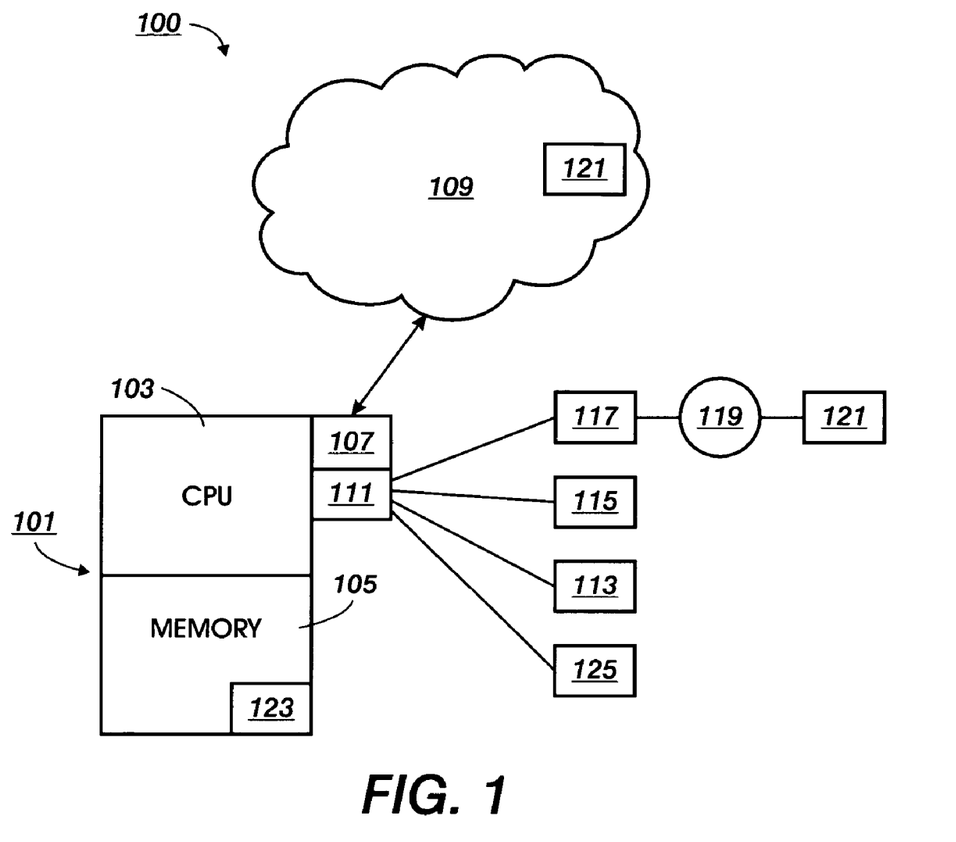
FIG. 1 illustrates a computer system within which a conversation-finder module can be utilized.

FIG. 1 illustrates a computer system 100 that can incorporate an embodiment. The computer system 100 includes a computer 101 that incorporates a CPU 103, a memory 105, and a network interface 107. The network interface 107 provides the computer 101 with access to a network 109. The computer 101 also includes an I/O interface 111 that can be connected to a user interface device(s) 113, a storage system 115, and a removable data device 117. The removable data device 117 can read a computer readable media 119 (such as a ROM within the device, within replaceable ROM, in a computer-usable data carrier such as a memory stick, CD, floppy, DVD or any other tangible media) that typically contains a program product 121. The user interface device(s) 113 can include a display device 125. The storage system 115 (along with the removable data device 117), the computer readable media 119, and (in some cases the network 109) comprise a file storage mechanism. The program product 121 on the computer readable media 119 is generally read into the memory 105 as a program 123 that instructs the CPU 103 to perform specified operations. In addition, the program product 121 can be provided from devices accessed using the network 109. One skilled in the art will understand that the network transmits information (such as data that defines a computer program). Generally, the information is embodied within a carrier-wave. As used herein, the term "carrier-wave" includes electromagnetic signals, visible or invisible light pulses, signals on a data bus, or signals transmitted over any wire, wireless, or optical fiber technology that allows information to be transmitted from one point to another. Programs and data are commonly read from both tangible physical media (such as those listed above) and from the network 109. Thus, the network 109, like a tangible physical media, is a computer-usable data carrier. One skilled in the art will understand that not all of the displayed features of the computer system 100 need to be present for the all embodiments that implement the techniques disclosed herein.

Figure 2:
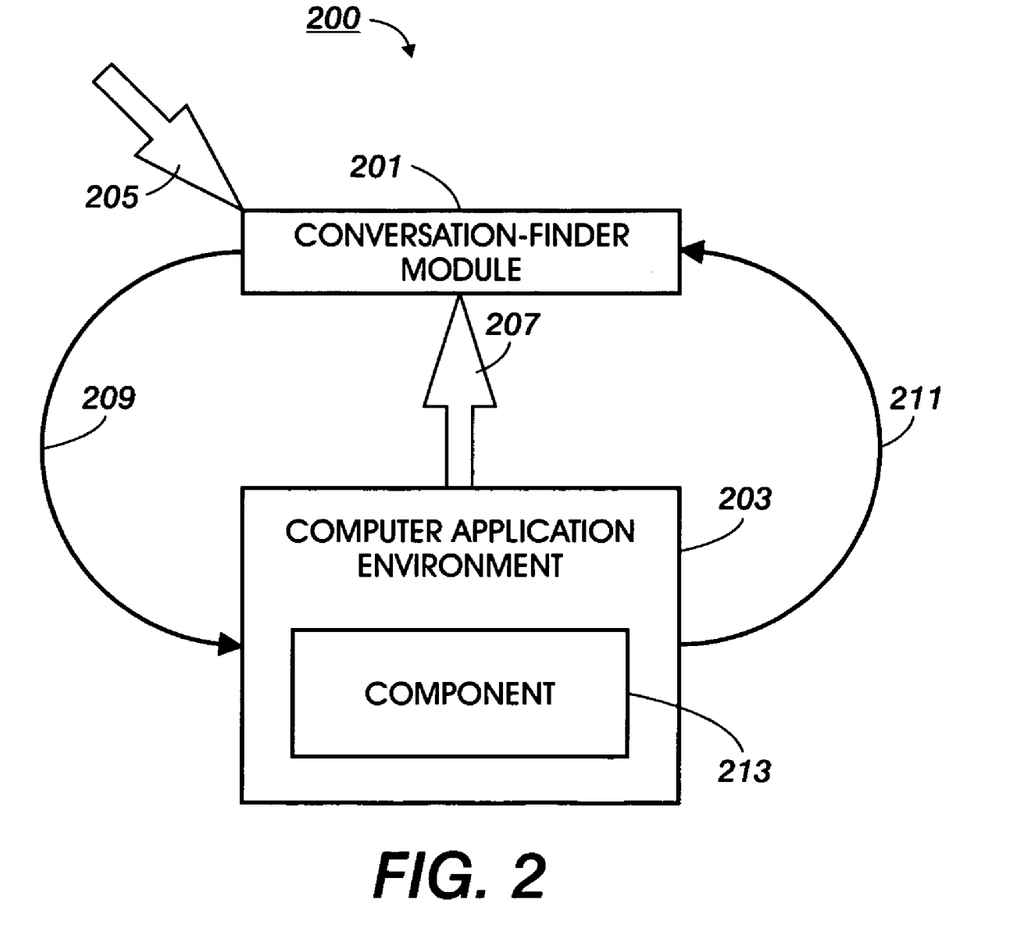
FIG. 2 illustrates an architecture that uses a conversation-finder module in accordance with an embodiment.

FIG. 2 illustrates a conversation-finder architecture 200 that includes a conversation-finder module 201 and a computer application environment 203. The conversation-finder module 201 receives a floor determination input 205 that can consist of digital signals from separate sources that represent communication (such as text, digital audio, video, or other human communication, or digitized analog signals) and/or a simulated floor determination input 207. The simulated floor determination input 207 can be one or more audio signals generated by the computer application environment 203, or by any other module (not shown) in communication with the conversation-finder module 201 (for example, these inputs could be generated by a computerized voice synthesizer, these inputs could also comprise pre-computed features along with, separate from, or instead of the synthesized audio). In addition, a first communication path 209 and/or a second communication path 211 allow control/state/command communications (either uni-directional, or bi-directional) between the conversation-finder module 201 and the computer application environment 203. One skilled in the art will understand that the first communication path 209 and the second communication path 211 can be combined into a single bi-directional channel and that there are a plethora of possible ways known to one skilled in the art for providing this communication (including, for example, networking communication, inter-task communication, inter-thread communication, pipes, parameter passing techniques, etc.). The computer application environment 203 can include an application component 213 (or more than one such component) such as those described herein.

Both the floor determination input 205 and the simulated floor determination input 207 represent any configuration that carry multiple input signals. These configurations include (for example, but without limitation), single or multiple analog inputs, single or multiple digital inputs, combinations of analog and digital inputs, video input(s), audio input, non-audio input provided by the computer application environment or component, as well as audio input and non-audio input provided external to the computer application environment, etc. in any combination or in any configuration.

FIG. 3 illustrates a conversation-finder module process 300 cooperating with a computer application environment process 400 in accordance with one embodiment. Both the conversation-finder module process 300 and the computer application environment process 400 can be invoked at the same time or separately, directly or indirectly by a power-up or reset signal. In some embodiments, one of the processes can invoke the other process. After invocation at a start terminal 301, the conversation-finder module process 300 performs any required initialization at an 'initialization' procedure 303; and after invocation at a start terminal 401, the computer application environment process 400 performs any required initialization at an 'initialization' procedure 403. Once both processes are initialized, an 'establish communication' procedure 305 and an 'establish communication' procedure 405 establish communication channels between the conversation-finder module process 300 and the computer application environment process 400.

One skilled in the art will understand that there are a multitude of technologies for providing the communication channels between the processes. These extend from, for example but without limitation, access to shared memory, inter-thread/task communication, remote procedure calls, pipes, etc.

Once communication is established, the computer application environment process 400 continues to a 'perform application' procedure 407 that can invoke the application component 213 to perform the operations that can cause information to flow to the floor determination input 205. At some point, the computer application environment process 400 continues to a 'provide computer application environment information' procedure 409 that sends application environment information to the conversation-finder module 201 over the second communication path 211 where the information can be used to control or influence the determination of conversational floors.

As is described by the essential material that has been incorporated by reference and the disclosure herein, a 'determine conversational floor' procedure 307 determines a conversational floor based on three or more floor determination inputs such as any combination of three inputs from the floor determination input 205 and/or the simulated floor determination input 207, wherein the conversational floor associates at least two of the three or more floor determination inputs as being on the conversational floor (multiple conversational floors can be determined responsive to the number of inputs and the ongoing conversations between the entities (human or otherwise). Information sent by the computer application environment 203 over the second communication path 211 is received by an 'acquire computer application environment information' procedure 311 and the conversation-finder module process 300 returns to the 'determine conversational floor' procedure 307 for subsequent processing.

Information about one or more of the conversational floor(s) can be provided by a 'provide conversational floor information' procedure 309 and is received by an 'acquire conversation-finder module information' procedure 411 over the first communication path 209. The computer application environment process 400 then returns to the 'perform application' procedure 407 to incorporate the conversational floor information for subsequent processing.

Thus, the computer application environment 203 and/or the application component 213 can adapt responsive to the members in the conversational floor and/or to the existence of the conversational floor(s). In addition, the application component 213 and/or the computer application environment 203 can provide control input (as compared to the simulated floor determination input 207) through the second communication path 211 such that the application can control or influence the operation of the conversation-finder module 201. Information about the conversational floor, and/or about one or more members on the conversational floor can be presented to a member, to a non-member, or to a monitor. This information can include situation information, personal information, graphical information, status information etc.

In one example embodiment, where the application component 213 is a first-person-shooter computer game that includes support for communications between players on the same team, when the conversation-finder module 201 detects that two teamed players are in conversation, it can notify the application component 213 which would respond by positioning the avatar's head for each player toward the other avatars who are members of the conversational floor.

In another example embodiment, where the application component 213 is a Social TV system, the conversation-finder module 201 can monitor communication between remote viewers and can detect a conversation between a person at a local site and a person at a remote site. The conversation-finder module 201 can use wordspotting techniques to determine that a television program was named and can specify a common-content action for the conversation participants to ensure that conversation participants can view the program (for example, by invoking a picture-in-picture of the named program).

In another example embodiment, where the application component 213 is a MMORPG that supports text communication between players, when the MMORPG detects that one avatar is facing another avatar, or that one player uses another player's name, or an avatar's name in the textual communication, this information can be communicated to the conversation-finder module 201 as probabilistic evidence of a conversation.

In another example embodiment, where the application component 213 is a Social TV system that provides speech communication between remote viewers, when the Social TV system detects that two individuals are watching the same television program, this information can be communicated to the conversation-finder module 201 as probabilistic evidence that, when they are talking, they are talking to each other.

One skilled in the art will understand other implementation details that are not germane to any particular embodiment. These details include, but are not limited to, detection of activation and deactivation of a source, any cleanup after a source is deactivated, etc.

In addition, one skilled in the art will understand that there are many ways the technology disclosed herein can be implemented using different architectures as well as different embodiments of any given architecture. The contemplated architecture includes the range from complete hardware implementations through complete software implementations using any programming methodology or combinations of programming methodologies and includes the possibility of having the processing capability distributed between several devices. In particular, such a one will understand, for example, that the conversation-finder module can be embodied as a computer program executing on a general purpose computer, as an electronic device designed to perform the functions of the conversation-finder module, or some combination of these. Thus, a procedure is equivalent to a self-consistent sequence of computerized steps that lead to a desired result. These steps can be defined by one or more computer instructions. These steps can be performed by a computer executing the instructions that define the steps. Thus, a "procedure" can refer (for example, but without limitation) to a sequence of instructions, a sequence of instructions organized within a programmed-procedure or programmed-function, or a sequence of instructions organized within programmed-processes executing in one or more computers. Such a procedure can also be implemented directly in circuitry that performs a function that is equivalent to the function performed by a computer executing the instructions. Applicant uses the terms "logic" and "module" to refer to devices that perform the procedure steps whether completely in circuitry, by execution of a program-procedure or program-function, or some combination.

From the foregoing, it will be appreciated that the disclosed technology has (without limitation) the following advantages:

(a) It enables a computer application environment to respond to the automatic detection of conversations between two sources from within a field of three or more sources.

(b) It enables the conversation-finder module to receive input from the computer application environment that provides the conversation-finder module with additional information that can be used to determine membership in conversational floors.

(c) It simplifies computer-enhanced environments by helping to direct open-channel communications to the relevant recipients.

(d) It enables users of a computer application environment to see and act upon implicit and explicit displayed representations of conversational floor state.

(e) It enables a computer application environment to store (log) and analyze records of the conversational floor state of social interactions occurring through the communication system, further enabling subsequent adaptive responses on the part of the computer application environment.

Although the technology has been described in terms of embodiments, one skilled in the art will understand that various modifications and alterations may be made without departing from the scope of the claimed invention. Accordingly, the scope of the invention is not to be limited to the particular embodiments discussed herein.

What is claimed follows:

1. A computer controlled method comprising:
communicating with a computer application environment comprising a plurality of sources;
receiving floor determination inputs comprising audio input and non-audio input from the sources within the computer application environment; and
analyzing the floor determination inputs, identifying two or more of the sources as members in a conversation based on the analysis of the floor determination inputs and defining a conversational floor that associates the two or more sources in the conversation based on the audio input and the non-audio input.

2. The computer controlled method of claim 1, wherein the computer application environment provides a collaborative environment.

3. The computer controlled method of claim 2, wherein the collaborative environment comprises one or more of an entertainment environment, a multiplayer game environment, an augmented reality environment, a mixed reality environment, a group conference environment, a command and control environment, a group display environment, a virtual reality environment, an interactive media environment, and a media playback environment.

4. The computer controlled method of claim 1, further comprising one or more of:
detecting persistence of the conversational floor;
determining a duration parameter for the conversational floor;
determining a stability parameter for the conversational floor;
presenting information to at least one user associated with one of the two or more sources in the conversational floor;
identifying a floor association comprising users associated with the two or more sources of the conversational floor and generating a service based on the floor association; and
logging the conversational floor.

5. The computer controlled method of claim 1, wherein the computer application environment includes a network that connects a plurality of computerized devices.

6. The computer controlled method of claim 1, wherein the floor determination inputs further comprise at least one of non-audio input obtained from the computer application environment, audio input provided external to the computer application environment, and non-audio input provided external to the computer application environment.

7. The computer controlled method of claim 1, further comprising:
creating a floor representation of the conversational floor.

8. The computer controlled method of claim 7, further comprising one or more of:
storing the floor representation;
displaying the floor representation;
displaying avatars representing the sources in the computer application environment;
indicating which of the floor determination inputs is associated with the conversational floor,
associating the avatars of the at least two sources in the conversational floor;
altering a visual representation of at least one of the sources in the computer application environment responsive to a change in the conversational floor;
altering the visual representation of at least one of the avatars responsive to a change in the conversational floor;
influencing the at least one avatar responsive to the conversational floor; and
altering the visual representation of the computer application environment by applying a conversational indicator to the two or more sources in the conversational floor, wherein the conversational indicator comprises at least one of an aura, a tint, a connection graphic, an overlay, and an invisibility mask.

9. An apparatus comprising:
a conversation-finder module to communicate with a computer application environment comprising a plurality of sources, to receive floor determination inputs comprising audio input and non-audio input from the sources within the computer application environment, to analyze the floor determination inputs, to identify two or more of the sources as members in a conversation based on the analysis of the floor determination inputs, and to define a conversational floor that associates the two or more sources in the conversation based on the audio input and the non-audio input.

10. The apparatus of claim 9, wherein the computer application environment provides a collaborative environment.

11. The apparatus of claim 10, wherein the collaborative environment comprises one or more of an entertainment environment, a multiplayer game environment, an augmented reality environment, a mixed reality environment, a group conference environment, a command and control environment, a group display environment, a virtual reality environment, an interactive media environment, and a media playback environment.

12. The apparatus of claim 9, further comprising one or more of:
a detection module configured to detect persistence of the conversational floor;
a duration module configured to determine a duration parameter for the conversational floor;
a stability module configured to determine a stability parameter for the conversational floor;
a presentation module configured to present information to at least one user associated with one of the two or more sources in the conversational floor;
a floor association storage module configured to identify a floor association comprising users associated with the two or more sources of the conversational floor and to generate a service based on the floor association; and
a recordation module configured to log the conversational floor.

13. The apparatus of claim 9, wherein the computer application environment includes a network that connects a plurality of computerized devices.

14. The apparatus of claim 9, wherein the floor determination inputs further comprise at least one of non-audio input obtained from the computer application environment, audio input provided external to the computer application environment, and non-audio input provided external to the computer application environment.

15. The apparatus of claim 9, further comprising:
a representation module configured to generate a floor representation of the conversational floor.

16. The apparatus of claim 15, further comprising one or more of:
a storage module configured to store the floor representation;
a floor display module configured to display the floor representation;
an avatar display module configured to display avatars representing the sources in the computer application environment;
a connection module configured to indicate which of the floor determination inputs is associated with the conversational floor;
an association module configured to associate the avatars of the two or more sources with the conversational floor;
an alteration module configured to alter a visual representation of at least one of the sources in the computer application environment responsive to a change in the conversational floor;
an avatar modification display module configured to alter the visual representation of at least one of the avatars responsive to a change in the conversational floor;
an avatar modification module configured to influence the at least one avatar responsive to the conversational floor; and
a conversation indicator display module configured to alter the representation of the computer application environment by applying a conversational indicator to the two or more sources in the conversational floor, wherein the conversational indicator comprises at least one of an aura, a tint, a connection graphic, an overlay, and an invisibility mask.

17. A computer-readable storage medium storing computer executable program code to be executed by a computer system, the computer executable program code comprising a method for:
communicating with a computer application environment comprising a plurality of sources;
receiving floor determination inputs comprising audio input and non-audio input from the sources within the computer application environment; and
analyzing the floor determination inputs, identifying two or more of the sources as members in a conversation based on the analysis of the floor determination inputs and defining a conversational floor that associates the two or more sources in the conversation based on the audio input and the non-audio input.

18. The computer-readable storage medium of claim 17, wherein the computer application environment provides a collaborative environment.

19. The computer-readable storage medium of claim 18, wherein the collaborative environment comprises one or more of an entertainment environment, a multiplayer game environment, an augmented reality environment, a mixed reality environment, a group conference environment, a command and control environment, a group display environment, a virtual reality environment, an interactive media environment, and a media playback environment.

20. The computer-readable storage medium of claim 17, further comprising one or more of:
detecting persistence of the conversational floor;
determining a duration parameter for the conversational floor;
determining a stability parameter for the conversational floor;
presenting information to at least one user associated with one of the two or more sources in the conversational floor;
identifying a floor association comprising users associated with the two or more sources of the conversational floor and generating a service based on the floor association; and
logging the conversational floor.

21. The computer-readable storage medium of claim 17, wherein the computer application environment includes a network that connects a plurality of computerized devices.

22. The computer-readable storage medium of claim 17, wherein the floor determination inputs further comprise at least one of non-audio input obtained from the computer application environment, audio input provided external to the computer application environment, and non-audio input provided external to the computer application environment.

23. The computer-readable storage medium of claim 17, further comprising:
generating a floor representation of the conversational floor.

24. The computer-readable storage medium of claim 23, further comprising one or more of:
storing the floor representation;
displaying the floor representation;
displaying avatars representing the sources in the computer application environment;
indicating which of the floor determination inputs is associated with the conversational floor;
associating the avatars of the at least two sources in the conversational floor;
altering a visual representation of at least one of the sources in the computer application environment responsive to a change in the conversational floor;
altering the visual representation of at least one of the avatars responsive to a change in the conversational floor;
influencing the at least one avatar responsive to the conversational floor; and
altering the visual representation of the computer application environment by applying a conversational indicator to the two or more sources in the conversational floor, wherein the conversational indicator comprises at least one of an aura, a tint, a connection graphic, an overlay, and an invisibility mask.

* * * * *